June 24, 1930. F. BRIGGS 1,767,054
PROCESS FOR TREATING MEATS
Filed March 17, 1924 3 Sheets-Sheet 1
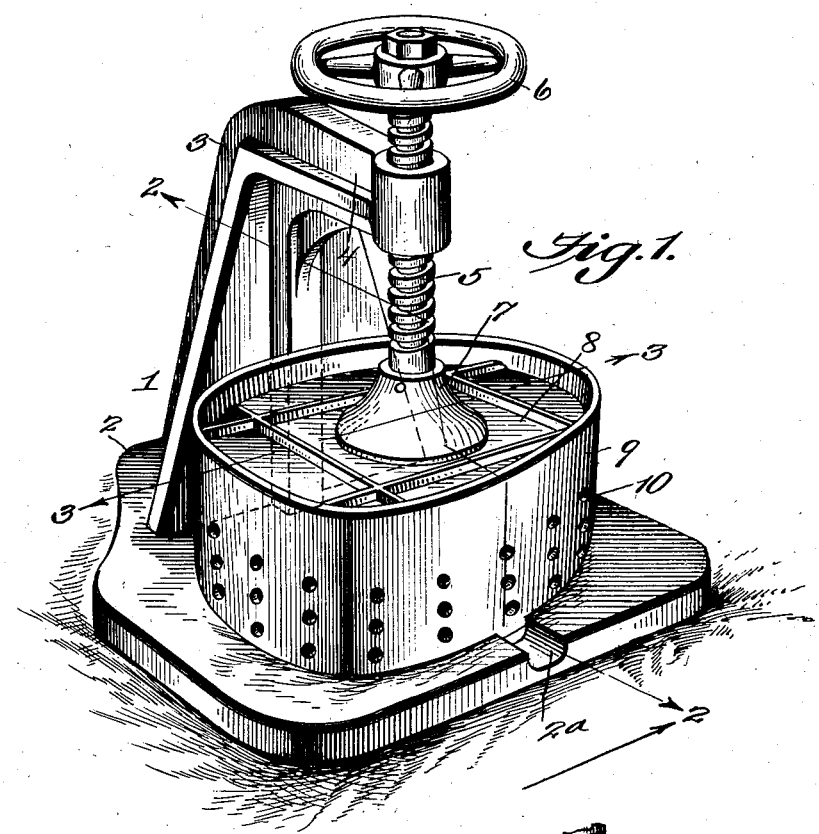
Inventor
Frederick Briggs,
By R. H. Boswell
His Atty.

June 24, 1930.  F. BRIGGS  1,767,054
PROCESS FOR TREATING MEATS
Filed March 17, 1924   3 Sheets-Sheet 2
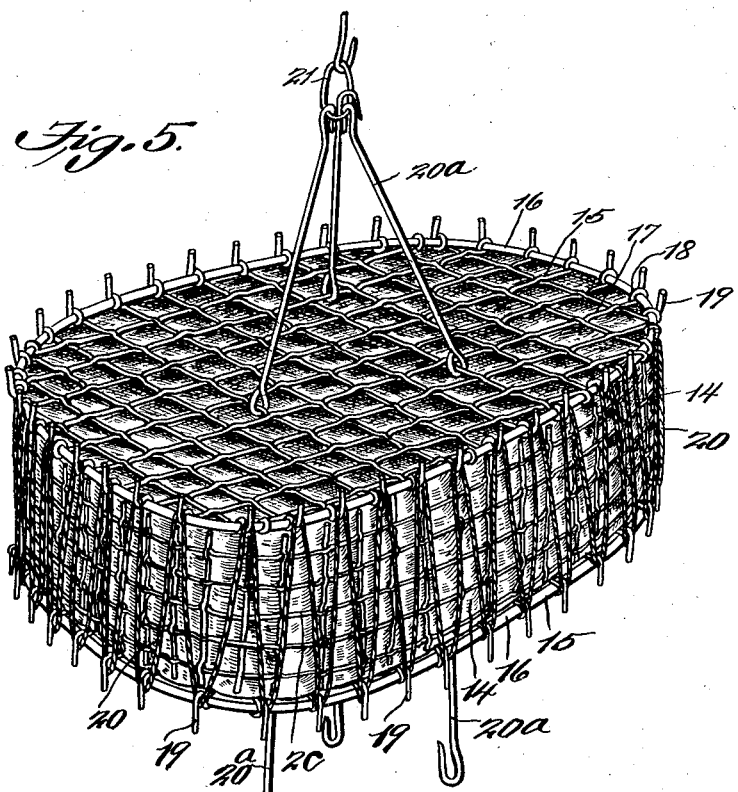
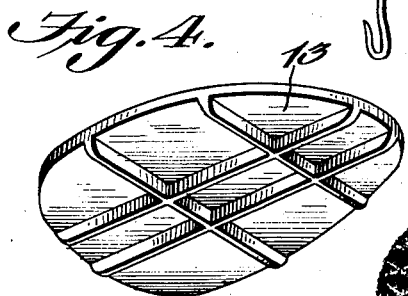
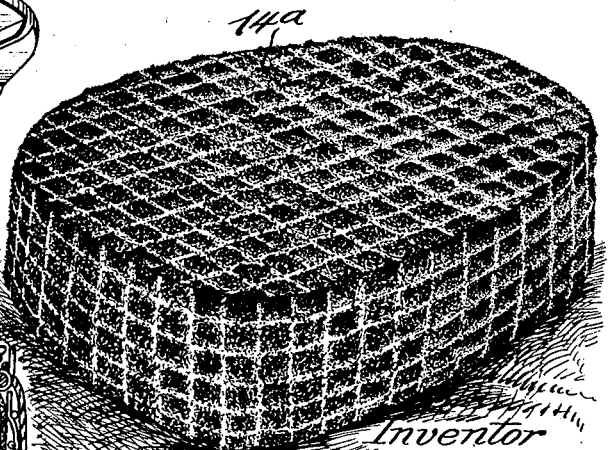
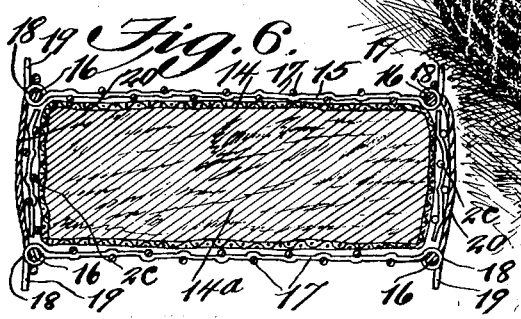

June 24, 1930.   F. BRIGGS   1,767,054
PROCESS FOR TREATING MEATS
Filed March 17, 1924   3 Sheets-Sheet 3
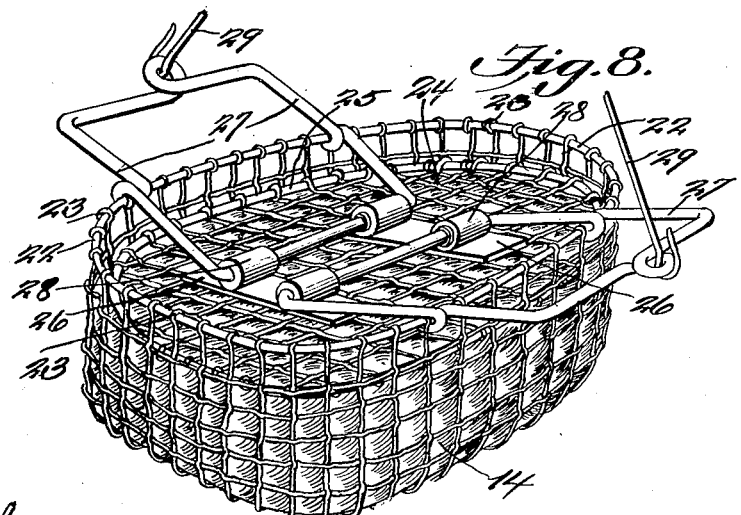
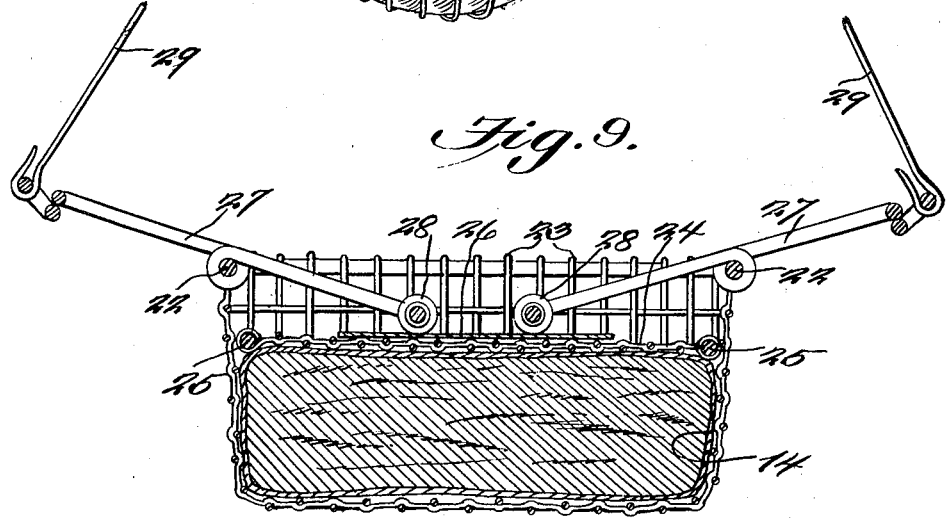
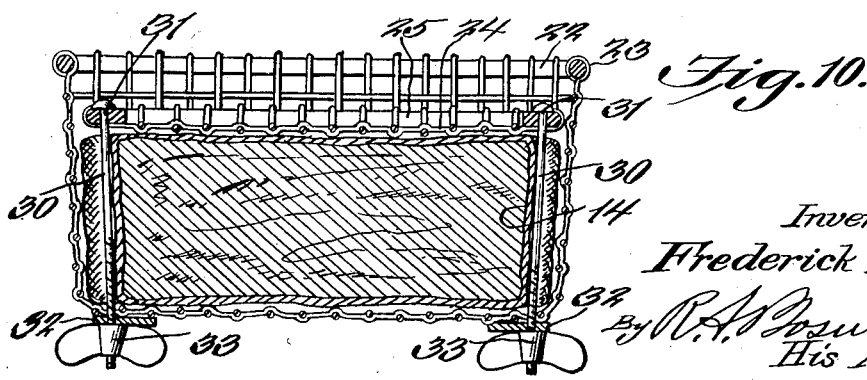
Inventor
Frederick Briggs,
His Atty.

Patented June 24, 1930

1,767,054

UNITED STATES PATENT OFFICE

FREDERICK BRIGGS, OF WASHINGTON, DISTRICT OF COLUMBIA, ASSIGNOR TO BRIGGS PACKING CO., OF WASHINGTON, DISTRICT OF COLUMBIA, A CORPORATION OF DELAWARE

PROCESS FOR TREATING MEATS

Application filed March 17, 1924. Serial No. 699,612.

For a considerable period there has been no substantial advance in apparatus and the process for treating meats, especially beef, for the purpose of drying the same to produce what is known commercially at the present time as chipped beef. In fact, years and years ago, after killing and butchering buffaloes, the various portions thereof would be strung up in the sun from three to four or five weeks and possibly at the end of such time they would be smoked over fires to insure proper drying of the same.

As previously stated, the present day process has not advanced to any marked degree for a considerable period. The beef at the present time is dried by evaporation, either in warm air or by hanging the beef over a fire in a smoke-house, and in just the same shape as when severed from the animal. Practically the only advance in treating such meat is the curing of the same in pickle which does not change the shape of the piece. For a long time it has been customary to hang the portion of the beef by a string, that is, over a fire for smoking purposes.

The meat, when cut from the animal, is not very even and, of course, due to the weight while hanging, the portion of meat so suspended stretches which makes one end extremely small and very dry. In some instances, the smaller end may be almost as hard as a bone while the bottom end remains large, even larger than when the meat is first suspended, due to the greater part of the meat falling toward the lower end, and, furthermore, such lower larger end does not dry properly and invariably contains too much salt. The more evaporation, the more the salt settles at the larger end of the meat. Furthermore, by this process there are hardly any two pieces the same shape and they will not fit properly in a slicing machine.

The extreme small ends of beef so cured are a dead loss and if, prior to this invention, they could have been utilized, a better article could have been sold for at least the same money, if not at a less cost, and without any waste whatever. It is obvious that when the larger ends of such pieces of beef contain too much salt, they are not as palatable, and by pressing the larger end of the beef, it is possible to discharge moisture therefrom.

It is obvious that meat so cured does not produce uniform slices when cut in a slicing machine and while such pieces of beef are usually trimmed of the fat and the unsightly exterior before placing in the slicing machine, the outer surfaces of such meat still contain crevices or cavities wherein insects, such as flies and the like, lodge, and it is well known that flies usually seek under cover for the purpose of blowing their eggs. Obviously, this is very unsanitary.

In view of these facts, it is the purpose of the present invention to provide an apparatus and process for treating meats, and especially beef, for the purpose of drying the same and producing chipped beef, making a better article, more unform slices, less waste and especially with more sanitation and giving a better flavor.

As previously stated, beef has been usually suspended when drying. Naturally, the brine and salt gravitate to the lower end, hence the excessive quantity of salt and moisture in the beef at present. The present invention and process, as another purpose, aims to dry the beef in uniform sizes and during the process of drying the meat is suspended horizontally instead of being hung perpendicularly. Also, due to the meat being in uniform portions and due to being supported horizontally, the smoke and heat have a greater area to contact with, consequently a greater portion of the heat and smoke will pass through the meat, curing the meat better and producing a better flavor, whereas in the old process and apparatus, smoke and heat may contact with the larger end of the piece and pass over the surfaces of the sides of the beef.

In order to afford sanitation and especially in order to prevent the beef from becoming contaminated from insects, the portion of beef, before being finally treated by the present apparatus and process, is covered with a gauze and, furthermore, the surface of the meat under the gauze is relatively smooth and even, having no crevices or cavities wherein insects may lodge.

Instead of resorting to two to three or four weeks in drying meat by a slow process of smoking, the present invention has for its purpose to apply oven heat for a few hours, and then subject the beef to a smoking process, in all taking about twenty-four hours more or less, producing a better article with a better flavor and less brine, such brine that may remain being uniformly distributed, and thereby saving considerable labor and expense.

Still another purpose is to provide an apparatus and process by which two or more pieces of meat, especially beef, can be formed in one single mass, the same as can be accomplished with a single piece of beef. All portions of beef will have the same shape and size, enabling the beef to be easily placed in a slicing machine, the slices being uniform, doing away with the small ends which now go to waste. There are four different cuts of beef used for drying. Three are cut from the hind quarter of the beef and one from the front quarter, the tender side of the round which commands the best price because of the large piece next to the knuckle which is much smaller and then the outside next to the shoulder from the fore quarter, and, as previously stated, by the present invention it is possible to press two or more of these smaller pieces into one mass.

A further purpose is that with the present invention and process it is possible, when heating the meat to dry it and when smoking the same, to turn the meat first on one side and then the other, thoroughly heating, drying and smoking the meat uniformly, giving the meat a uniform flavor throughout, there not being more salt or moisture at one end or one side than at the other.

To accomplish the result of forming the meat in a mass, it is the purpose to place two or more pieces of meat, either from the hind quarter or from the tender side of the round, or portions next to the knuckle or next to the shoulder of the fore quarter, together, placing them in a container with a follower head, and then by applying pressure on the follower head, either hydraulic pressure or hand pressure such as disclosed, all the moisture and the majority of the brine may be pressed out. However, before applying the pressure on the meat in the receptacle or container, the meat is placed in soak in hot water, acting to loosen the brine to some extent in order to cause the brine to leave the pores of the meat when subjected to high pressure. Before subjecting the meat to the high pressure, it is wrapped in a gauze and then it is removed from the container or receptacle and bound in a meshwork to retain the meat in the shape in which it has been pressed.

The meat is then subjected to heat for about twenty-four hours, more or less, the meat being turned first on one side and then the other, and is then subjected to a process of smoking sufficient to give the meat the proper flavor, and since the meat is supported horizontally instead of perpendicularly, the meat will take the smoke quicker and thereby produce a much better finished product.

In subjecting the meat to high pressure and in applying the drying process, a jelly is created, acting as a binder for the purpose of adhering the particles of meat together. Furthermore, the high pressure will close the pores after causing an ejection of the brine. Since the drying process by means of heat and smoke is accomplished in a relatively short time as compared with the old method of three to four or five weeks' drying, the brine is more quickly removed, and since the drying process is uniformly distributed, a much better flavored meat is produced.

A still further purpose is the provision of a container for the reception of the meat during its pressing process, with a removable bottom so supported in the container that, when the meat is in the course of pressing, the moisture and brine will pass readily from the bottom of the container due to the fact that the removable bottom is supported in spaced position above a marginal flange of the container. To assist in the extraction of the brine, the wall of the container is provided with perforations which also permit of the flow of the moisture.

Furthermore, the invention and process includes a form consisting of wire fabric of a large mesh comprising upper and lower pieces laced upon opposite sides of the portion of the meat, so that the meat may be subjected to a drying process by applying heat from an oven, enabling the fabric form to be turned from one side to the other, there being means carried by the opposite sections of the fabric form so that the meat can be suspended in a smoke-house, still permitting the meat to be turned over first on one side and then the other. In this way, the meat thoroughly smokes and dries.

Also, the invention contemplates a wire fabric form or container with a fabric follower head to receive the meat, there still being a covering of gauze over the meat, in conjunction with means engaging with the follower head and suspended from a hanger to insure constant pressure on the follower head to retain the meat in the form in which it has been pressed. The meat, when in this container, may still be subjected to a drying process by heat and then by smoking. However, in this instance, it is not possible to turn the meat first on one side and then the other.

It is to be understood that the particulars herein given are in no way limitative and that, while still keeping within the scope of the invention, any desired modifications of detail and desired proportions may be made in the apparatus and process according to the circumstances.

The invention comprises further features and combinations of parts to be hereinafter set forth, shown in the drawings and claimed.

In the drawings:

Figure 1 is a view in perspective of a conventional screw press, showing the improved meat container or form mounted on the press with a follower head engaged under the screw for the purpose of subjecting the meat to pressure.

Figure 2 is a sectional view on line 2—2 of Figure 1, showing the space between the removable bottom and the flange at the bottom of the container.

Figure 3 is a sectional view on line 3—3 of Figure 1.

Figure 4 is a detail view of the removable bottom 13.

Figure 5 is a perspective view of a wire fabric form in which the meat is laced after being subjected to high pressure, showing means on opposite sides of the form whereby the meat may be suspended in a smoke-house or supported in an oven.

Figure 6 is a longitudinal sectional view on line 6—6 of Figure 5, more clearly showing the manner in which the meat is held in shape.

Figure 7 is a detail perspective view of a piece of meat, showing its shape after being subjected to the process herein disclosed.

Figure 8 is a perspective view of a wire fabric container or form, showing the follower head and the means for exerting constant pressure on the head to retain the meat in the form in which it has been pressed.

Figure 9 is a sectional view on line 9—9 of Figure 8.

Figure 10 is a cross sectional view through a wire fabric container or form, showing the pressure levers dispensed with.

Referring to the drawings, 1 designates a conventional form of screw press comprising a base 2, an upstanding bracket 3 with an overhanging arm 4. Engaged in a screw bearing of the arm is a screw 5 having a hand wheel 6 and a swivelled foot 7. It is to be understood that this apparatus may include any form of press. However, the present disclosure of press is simply illustrative of the idea. In fact, the meat under the follower head 8 (which is a part of the foot 7) in the meat form or container 9 may be subjected to pressure by any means, either hand power or hydraulic pressure.

The meat form or container 9 may be any size and any shape, either oblong, square or approximately egg-shaped as shown in plan view. The container or form may be made of any metal, preferably cast from aluminum, and its wall is provided with a plurality of perforations or apertures 10 to permit of the discharge of moisture and brine from the meat. The lower portion of the wall of the container or form merges into an inwardly lateral marginal flange 11, the lower surface of which has a marginal rib 12 so as to hold the container or form spaced from the base on which the form rests.

A removable bottom 13 is received in the container or receptacle and is provided with intersecting transverse ribs, acting to reinforce the removable bottom. The ribs also engage with the marginal flange 11 and thereby retain the bottom spaced above the flange. Since the bottom is of such proportions to freely fit in the receptacle or container, so as not to engage with the inner surface thereof, the brine and moisture may easily flow from the meat when pressure is applied on the follower head 8.

Before the meat, whether in a single piece or in several pieces, is subjected to the desired pressure (it being possible to ascertain the approximate desired pressure after having subjected several pieces of meat to pressure), it is wrapped in a gauze 14 and after applying pressure it is removed from the form or press and upon opposite sides of the meat, wire fabric holders 15 are disposed. These holders may be any shape and size, preferably corresponding to the size and shape of the receptacle or form 9. Each holder consists of a relatively heavy wire frame 16 with intersecting longitudinal and transverse fabric wires 17. These longitudinal and transverse wires are coiled about the frame 16, as at 18, and their terminal portions are bent upwardly to constitute hooks 19 with which a lacing 20 may engage for lacing the opposite holders in position. Where the longitudinal and transverse wires of the wire fabric holders intersect or cross, they are bound together securely. In fact, each holder subsequently to being constructed is subjected to a process of tinning which acts to seal the joints between the intersecting longitudinal and transverse wires and in addition to this, the coils, where they engage with the wire frame, may be heavily tinned, so as to prevent distortion of the various wires.

After lacing the meat between the two holders with the gauze over the surface of the meat, the meat between the two holders may be placed in an oven and subjected to the required amount of heat for drying the meat, not cooking it. In fact, the meat is subjected to a slow or uniform heat, for substantially twenty-four hours more or less. Obviously, if subjected to twelve hours drying in an oven, the meat will be more moist than if subjected for twenty-four hours, and if subjected to thirty hours drying in an oven with a slow but uniform heat, the meat will be drier than when subjected to twenty or twenty-four hours' heat. The drier the meat, the better the flavor and the sweeter the meat. While the meat is being subjected to this drying process from heat in the oven, it is possible to turn the meat first on one side and then the other, so that the meat will receive a uniform drying process throughout its entirety. In fact, the flavor will be uniform and moreover the slices will be practically the same.

A plurality of hooks 20ª are loosely connected to the fabric holders, as shown in Figure 4, and the hooks proper at their upper ends may engage a ring 21 which may be suspended in any suitable manner in a smokehouse. Obviously, the meat may be smoked on first one side and then the other by simply detaching one set of hooks and connecting the opposite set. It will be noted that meat is always in a horizontal position, not vertical, and due to the meat being of substantially uniform shape in cross sectional area, the drying process by smoking will be uniform throughout.

Referring to Figures 8 and 9, it will be seen that the fabric container has sides the same as the form or container 9. This form or container may be the same shape and the same size as the form or container 9 and it has a relatively heavy marginal frame 22 with which the wires of the fabric sides, ends and bottom are connected by coils 23. Made to fit in the form or container in Figures 8 and 9 is a follower head 24 of wire fabric. In fact, this follower head is of a shape and size to fit the container or form and consists of a relatively heavy marginal wire frame 25 with which the longitudinal and transverse wires are connected. This wire container and follower head are heavily tinned in the same manner as that disclosed in Figure 5.

Plates 26 are secured to the follower head in any suitable manner and fulcrumed on the sides of the frame or container are pressure levers 27. These levers on their adjacent portions are provided with rollers 28 to engage with the plates and by connecting suitable suspension means or hooks 29 to the remote portions of the pressure levers, the container or form may be suspended in a heat oven or smoke-house. In this way, the rollers exert a constant pressure on the follower head and retain the meat in the form in which it has been pressed.

As disclosed in Figure 10, the pressure levers are dispensed with and instead clamping screws 30 are connected to the follower head, as at 31, and are disposed immediately adjacent the sides of the form or container and pass through relatively heavy plates 32 fastened on the bottom of the container or form, there being relatively large wing nuts 33 mounted on the screws so that by adjusting them the follower head may be drawn into the wire fabric container or form and thereby exert pressure on the meat and retain it in shape and still permit the form to be turned first on one side and then the other.

It is obvious that there may be any number of screws so that a constant uniform pressure may be urged on the meat.

This apparatus and process may not only be used for treating especially beef, but it may be used in connection with any meat, either bacon, ham or the like. In treating ham, the same may be boned and the greater part of the fat removed after being taken from pickle and then subjected to pressure by the apparatus in Figure 1, then retained in shape by the wire fabric form in Figures 5, 8, 9 and 10, and then subjected to the drying process by heat, the result being that a product of dried ham may be produced, such ham being in condition to be chipped the same as beef by the use of a slicing machine.

Bacon in two or more pieces may be treated in a like manner, the portions of bacon being taken from the initial treatment, such as pickling, and subjected to pressure as with the apparatus in Figure 1 or by any other suitable means, and then retained in shape as with the apparatus in Figures 5, 8, 9 and 10, and then dried through a heating process of anywhere from twelve to twenty-four hours, in which case the portions of such meat will adhere due to the jelling of the adjacent parts of the meat. In such case, the bacon may be formed in different shapes according to the character of means for maintaining the meat in form after pressure is applied, then it may be placed in a slicing machine where the bacon will be cut in slices of uniform size consisting of several pieces of bacon in one slice.

Primarily, this apparatus and process permits fresh beef trimmings in a number of pieces, after fat and sinews have been removed, to be run through a coarse plate grinder. These pieces of meat are then put down in pickle from five to ten days. This pickle consists of the requisite quantities of salt, sugar and saltpeter. After pickling, it is taken out and the particles of meat subjected to high pressure, compressing the particles, removing the pickle or brine and then the meat is ground up as fine as possible and then placed in a cloth in a flat form somewhat similar to that shown in Figure 7, for instance, about four inches thick, the brine having been previously pressed out and then the meat with the gauze or cloth about it is placed between the two holders and laced. The meat in this condition is then subjected to the drying process, as previously stated, through the medium of oven heat and then smoke. The meat may be subjected to a slow oven heat for drying for twelve to twenty-four hours more or less and then it may be placed in a smoke-house, the result being a piece of perfectly dried beef.

With this process it is possible to successfully produce dried beef from ground or chopped beef due to pressing the particles together, pressing out the moisture and drying by slow oven heat and smoking so as to finish in one piece, making perfect dried beef with no fat, gristle or sinews, the meat being in one solid mass which may be placed in a machine for slicing in the most desirable size.

Dried beef, in the beginning, was termed chipped beef because the meat was dried in small strips and chipped off with a knife. However, it has been found that beef could be cured in larger bulk and since the advent of the modern slicing machine, such larger portions of beef could be placed in such machines and larger slices cut. In this way, a demand for this class of beef has been created. The production of the slicing machine necessitated the curing of larger pieces of beef, giving the packers and curers more trouble than any other branch of their business. Obviously, the larger the piece of meat the longer it takes to cure it and the larger the piece the longer it takes to evaporate the moisture. At this stage is where the packers have their greatest trouble. It is obvious that if the packers could stop the cure the minute the meat is taken out of pickle, the product would be perfect as far as cure is concerned, as the pickle has accomplished the purpose for which it is intended. However, the pickle should be removed immediately, but by the present process of evaporation this is impossible and at this time the pickle begins to be a very destructive active agent and at this time the meat is placed in a warm room which helps the remaining pickle to work faster, and having fully cured the meat, the remaining pickle then starts to destroy the gelatine and tender and finer parts of the meat and continues until the moisture is evaporated.

In the present apparatus, the process starts at the time the meat is cured through and the best results have been obtained by pressure. All of the pickle is removed, thus stopping the agency which would become destructive, hence the advantage can be appreciated instantly and the large amount of the finer particles of the meat is saved and the great amount of shrinkage and time. Also this process practically saves all the meat minus the pickle, as this process will produce dried beef fully cured, not overcured, and as salt is indestructive and cannot be destroyed by evaporation, hence the cause of dried beef trouble of today.

In the operation, the meat, especially beef, after being pickled in one or more pieces, is disposed in hot or warm water and thoroughly soaked. It is then placed in a gauze or cloth and then subjected to a high pressure, as with the apparatus in Figure 1, removing all the moisture and the majority of the brine. It is possible to press out as much moisture and brine as may be desired. After subjecting the meat to this pressure, the meat may be easily removed by inverting the form or container and pressing the removable bottom from the under side, causing the discharge of the body of meat. The meat is then disposed in a wire container or form or between two form members, as in Figure 5, for the purpose of retaining it in shape. The meat in such form, either in Figure 5 or in Figures 8, 9 and 10, is then subjected to a drying process by heat, anywhere from eight or nine hours to twenty-four hours, more or less. While the meat is in such form as in Figures 5, 8, 9 and 10, it is dried through a heating process, then it is subjected to smoke in a smoke-house to give the meat flavor throughout its entire area. During its drying process, the meat may be turned over first on one side and then on the other, so as to insure thorough drying as may be desired, then the meat is removed from the container or form as in Figures 5, 8, 9 and 10, the gauze then being removed, in which case the meat is then ready to be placed on a slicing machine, in which case the meat will readily slice in uniform portions, there being no ends to go to waste, thereby giving a better product with a better and milder flavor. It is possible to trim a portion or several pieces of beef, so as to remove all the sinews, fat and the like, and when such meat is treated with this apparatus and process, a special meat product may be produced. The slices will be uniform throughout and it is possible to put this kind of meat in packages which will sell more readily than chipped beef now on the market and for less money.

In applying pressure to the meat when in the form or press, the moisture passes out through the apertures in the side of the container 9 and between the edges of the bottom 13 and the wall of the container. It will be noted that the base 2 has an outlet groove or channel 2$^a$ which permits of the discharge of the moisture from the meat, which moisture may deposit in the depression 2$^b$ of the base.

The gauze around the meat is retained when the meat is placed in the wire holder ready for the slow oven heat. However, before the meat is placed in the wire fabric holder, a band 2$^c$ of wire fabric is placed around the edge of the meat over the gauze, after which the lacing is applied, holding the meat firmly in place while it receives the slow oven heat. It is obvious that this wire fabric band 2$^c$ may be dispensed with and the lacing in this instance will contact with the gauze over the meat. In this regard, either method may be used.

The invention having been set forth, what is claimed is:

A process for treating lean fresh beef trimmings, consisting in removing the gristle, fat and sinews, passing them through a coarse plate grinder, putting them down in pickle of salt, sugar and saltpeter for a substantial period, soaking them in hot solution, compressing the same to remove the moisture and brine, grinding the same as fine as possible, binding the meat particles in gauze and flattening the bulk, and then again placing the same under pressure, retaining the compressed meat in shape in a fabric holder, and forming it into the desired shape, subjecting the compressed meat to a drying heat while in such shape, turning the bulk while in the holder first on one side and then the other and maintaining it in a horizontal position, whereby the drying heat may thoroughly percolate through the meat and finally smoking the same.

In witness whereof, the inventor's signature is hereunto affixed.

FREDERICK BRIGGS.